Figure 1:
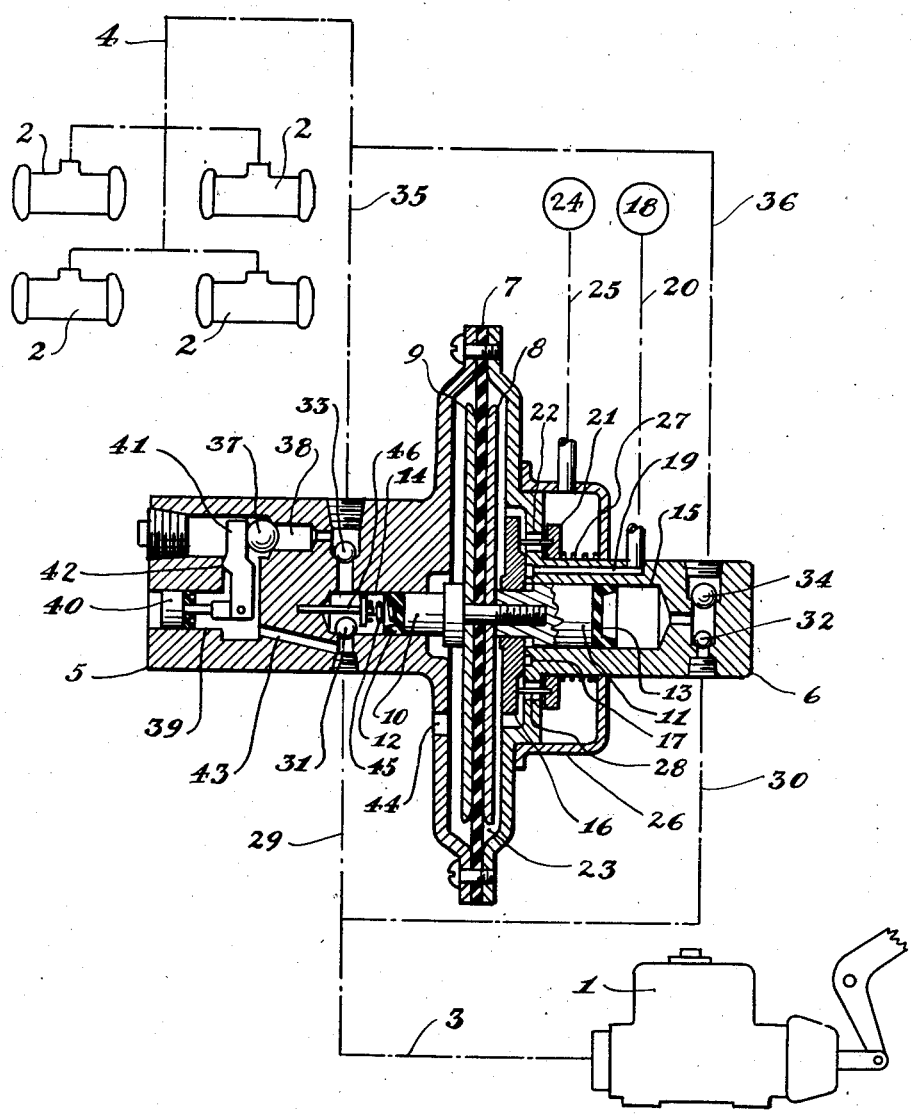

Aug. 29, 1944.   W. STELZER   2,357,032
HYDRAULIC BOOSTER
Filed Oct. 7, 1942

INVENTOR.
William Stelzer

Patented Aug. 29, 1944

2,357,032

UNITED STATES PATENT OFFICE 2,357,032

HYDRAULIC BOOSTER

William Stelzer, Detroit, Mich.

Application October 7, 1942, Serial No. 461,188

12 Claims. (Cl. 60—54.5)

The invention relates to hydraulic boosters, and more particularly to a novel hydraulic booster for braking systems and the like in which the pressure producing elements are reversible, and boost the hydraulic pressure during their advancing as well as during their retractile movements.

The object of the invention is to provide a booster of greatly reduced size but with an unlimited capacity so that a booster built according to the novel principle may be used effectively on vehicles of any size.

Another object is to produce a simple booster unit that is compact in construction, light in weight, and economical to manufacture.

The invention also aims to obtain an inherently modulated performance where the boosted pressure is a pre-determined multiple of the master cylinder pressure, to obtain "pedal feel."

Further important features and aims will become apparent by inspection of the drawing, wherein:

Fig. 1 shows a cross-section of the novel booster unit, connected to a conventional hydraulic braking system which is illustrated diagrammatically.

Describing the invention now in detail, the novel booster unit is shown in combination with a conventional hydraulic braking system, consisting of a master cylinder 1 operated by the operator, and wheel cylinders 2 which operate the brake shoes. The booster is placed intermediate the usual brake line which leads from the master cylinder 1 to the wheel cylinders 2, whereby the pressure transmitting line leading from the master cylinder 1 to the booster is denoted with numeral 3, forming the primary, or low pressure circuit, and 4 is the pressure transmitting line leading from the booster to a plurality of wheel cylinders, forming the secondary or high pressure circuit.

The booster unit consists of housings 5 and 6 secured together with a diaphragm 7 interposed. The latter is clamped between diaphragm plates 8 and 9 held firmly between a small piston 10 and a large piston 11 secured together to move in unison. Said pistons have hydraulic seals 12 and 13 and move in cylinder bores 14 and 15. The portion of piston 11 engaging piston plate 8 is reduced in diameter to accommodate a disc valve 16 which slides thereon and has a seat to close annular groove 17 in communication with a source of vacuum or other low pressure 18 through passage 19 and line 20. Another disc valve 21 is mounted to slide on the hub portion of housing 6 and to close off passages 22 which serve to provide communication between chamber 23 and an atmospheric fluid pressure 24 which has a line 25 connected with housing 26 secured to housing 6. A light spring 27 urges disc valve 21 into a closed position, and pins 28 extending from valve disc 21 space the latter from disc 16 so that only one can be seated at a time. In Fig. 1 disc 16 is shown seated and 21 unseated. It is preferable that the amount of valve lift is very small to provide an inherent tendency urging the valve to be in one position or another, i. e., either valve disc 21 seated and 16 unseated, or the latter seated and 21 unseated. It is apparent that pins 28 may also be secured to disc 16 whereby spring 27 may be dispensed with.

The primary or low pressure line 3 is connected to the cylinder bores 14 and 15 through lines 29 and 30, and check valves 31 and 32. The bores 14 and 15 also communicate with the secondary or high pressure line 4 through check valves 33 and 34 and connections 35 and 36.

The housing 5 contains a pressure modulating device, and fluid return valve consisting of a ball valve 37 closing off a passage 38 leading to the high pressure line 35, and a cylinder 39 having a sliding piston 40 connected to a lever 41 whose fulcrum point is at 42. A passage 43 leads from cylinder 39 to low pressure line 29 and master cylinder 1.

Housing 5 is provided with an air vent hole 44 so that disc 9 is exposed to atmospheric pressure. In order to return pistons 10 and 11 to a starting position where plate 8 rests against 16, the latter closing annular groove 17, I provide a return spring 45 resting against a guard 46 which serves to retain ball 31 in its proper place.

Having thus described the novel construction, I shall now illustrate the operation of the same. The booster may be regarded as two distinct mechanisms operating alternately as one or the other. In one form, hereinafter also referred to as form 1, cylinder 15 is the low pressure cylinder connected to master cylinder 1, and 14 is the high pressure cylinder connected to the wheel cylinders 2. In this case the larger piston 11 moving the smaller piston 10 produces a higher pressure in bore 14, accomplishing this in a similar manner as do boosters that do not use any source of power other than manual, whereby a larger amount of fluid is expended by the master cylinder to pump a smaller amount of fluid under higher pressure to the wheel cylinders. In the other form, referred to as form 2, 14 is the low pressure cylinder in communication with the master cylinder, and 15 is the high pressure cylinder in communication with the wheel cylinders. The force required in addition to that of piston 10 to move piston 11 against the secondary pressure in chamber 15 is made up by the expansible motor mechanism consisting of diaphragm 7, plates 8 and 9, and the outer portions of housings 5 and 6 which form the cylinder of said expansible motor mechanism. The modulating valve serves to relieve the secondary pressure when it is too high and to return the fluid back to the master cylinder.

It is apparent that while in the first form too much fluid is expended by the master cylinder to produce the secondary pressure, this is compensated fully in the second form when only a small amount of fluid is used from the master cylinder to pump a greater amount of fluid into the wheel cylinders.

Describing the operation now by way of example, and assuming that the booster is in the position as indicated in Fig. 1, with the exception, however, that plate 8 rests against disc 16, the expansible motor mechanism is at rest because atmospheric pressure is on both sides of diaphragm piston 7, disc 21 being unseated and disc 16 closing off groove 17 and the supply of vacuum. Assuming that the operator depresses the brake pedal to operate the brakes, the booster system will respond as form 1. The hydraulic fluid from the master cylinder flows through lines 3 and 30, past check valve 32 into cylinder 15 to move pistons 11 and 10 whereby the latter produces an increased pressure in cylinder 14 which is transmitted through check valve 33 and lines 35 and 4 to wheel cylinders 2, check valves 31 and 34 being closed by such increased pressure. The booster ratio is the same as the ratio between the areas of pistons 10 and 11. Pistons 10 and 11, as well as diaphragm 7, which move in unison, have only a short stroke at the end of which piston 11 picks up disc valve 16 to unseat it so that the air in chamber 23 is evacuated. At the same time valve 21 is permitted to close and is held in a closed position due to the atmospheric pressure acting thereon. As soon as the suction acts on diaphragm 7 the pistons are urged into a reversed direction, whereby a greater pressure is produced in cylinder 15 so that valves 32 and 33 close and 34 and 31 open. Thus the booster is converted into form 2. The master cylinder or primary pressure acts on piston 10 assisting the expansible motor mechanism to advance piston 11 into cylinder 15 and to pump a larger amount of fluid to the wheel cylinders than is used by the master cylinder to act on piston 10. In order to keep the secondary pressure a predetermined multiple of the primary pressure, the modulating valve is provided. The fluid in passage 38 under secondary pressure urges ball 37 to unseat. The hydraulic pressure in cylinder 39 acting on piston 40 and ball 37 urges the latter to stay seated. Piston 40 is so proportioned that its action on ball 37 together with the direct action of the primary pressure, is equal to the secondary fluid pressure acting on said ball from the opposite side when the secondary fluid pressure is a pre-determined multiple of the primary pressure. I have found it practical to keep the pressure ratio of the modulating valve slightly higher than the booster ratio of pistons 11 and 10, i. e., to proportion piston 40 and ball 37 in such a way that a higher pressure is required to unseat ball 37 than can be obtained by piston 10 when fluid is forced into chamber 15 by manual power. The slight addition in pressure which the modulating valve maintains while the booster acts as a power unit is not noticeable by the operator and prevents the return of fluid from the secondary circuit to the master cylinder 1 through the modulating valve when operating as form 2. Since the hydraulic pressure produced in cylinder 15 is too great and not in proportion to the hydraulic pressure produced by the master cylinder, the excessive pressure acting in passage 38 against ball 37 unseats the latter against the opposition of the fluid in chamber 39 so that hydraulic fluid from line 35 is forced into chamber 39 and from there through passage 43 to cylinder 14 or to master cylinder 1. While the fluid thus displaced has an effect on the speed of travel of the brake pedal, causing it to retard or to retract a short distance, yet this action is not felt by the operator because the quantity of fluid involved is minute. Also it will be observed that the fluid returned to the primary circuit does not increase the pressure therein because the manual force with which the brake pedal is depressed is yielding and resilient. When the pistons 10 and 11 are near the end of their stroke, piston plate 8 presses valve 16 into a closed position and opens valve 21 so that chamber 23 is under atmospheric pressure again, whereby the booster is ready to start a new cycle without the aid of power, acting again as form 1, where the pistons move towards the left. Before the stroke is completed, the brakes may be fully applied so that the movement of the pistons ceases and the latter remain in a "holding" position. If the wheel cylinders require a large amount of fluid for the expansion of the brake shoes, a series of manual and alternate power strokes may take place before the brakes are fully applied. If the brakes become fully applied during a power stroke the pistons continue their travel nevertheless until piston plate 8 seats disc 16 and unseats disc 21 so that the booster becomes subject to the manual operating pressure only, holding the pistons stationary against the hydraulic pressure in the secondary circuit. Supposing now that the operator releases the brake pedal to relieve the hydraulic pressure in the master cylinder, the force to keep ball 37 seated ceases so that the fluid from the wheel cylinders may return immediately to master cylinder 1 by unseating ball 37, thus permitting the release of the brakes.

Valves 16 and 21 have a tendency to stay in the position into which they are thrown. For instance in the position illustrated in Fig. 1 where valve 16 rests against groove 17 the suction produced by the latter holds valve 16 in place and valve 21 unseated. After valve 16 is unseated by piston 11, and valve 21 is seated, a suction is produced in chamber 23 and the atmospheric pressure acting on disc 21 keeps the latter closed whereby disc 16 is prevented from closing due to pins 28. The same principle applies in snapping the valves into the opposite position at the instant the seal is broken. This is a necessary requisite to prevent valves 16 and 21 to remain in a position where both discs are open for any length of time, resulting in a loss of power. This is also the reason for keeping the gap between the valve discs and their seats at a minimum.

I wish to make it understood that the proportions of the elements of the novel booster were selected mainly to make a clear illustration of the principle of the invention, and these proportions may be changed to adapt the booster for the different purposes for which it may be used. It will be observed by studying the drawing that the characteristics of the booster will be radically changed by increasing or decreasing the stroke of the hydraulic pistons 10 and 11 and diaphragm 7. An increase in the stroke would result in a decrease of the necessary strokes or reciprocations for one brake application, whereby a single stroke operating under form 1 might be sufficient, and the application of power under form 2 would act merely as a reserve. On the other hand, if the stroke of the reciprocating pistons is reduced, the necessary reciprocations for one brake application are increased, whereby they may become rapid vibrations.

While I have shown only one form of the invention, I do not wish to be limited to this particular embodiment alone, as it is apparent to those skilled in the art that it may be carried out in ways different from that shown without departing from the scope of the invention, thus for instance either diaphragms or pistons may be used to obtain the same function, or the elements may be grouped in separate units of modified construction.

Furthermore, it is obvious that the booster unit may be used to serve hydraulic systems other than for brakes, such as any system having hydraulic pressure producing means and hydraulic pressure receiving means, where the hydraulic pressure of the latter is a pre-determined multiple of that of said hydraulic pressure producing means.

I claim:

1. In a hydraulic braking system having a manually operated hydraulic pressure producing device and hydraulic pressure receiving means to apply the brakes, in combination, a hydraulic booster comprising an expansible chamber of large displacement arranged to receive fluid under pressure from said hydraulic pressure producing device and to transmit fluid under pressure to said hydraulic pressure receiving means, an expansible chamber of smaller displacement arranged to force fluid under pressure to said hydraulic pressure receiving means, said expansible chambers being operatively connected to work in unison, check valves intermediate said hydraulic pressure receiving means and said expansible chambers to prevent the return of hydraulic fluid from said pressure receiving means to said chambers, power operated means to return said chambers to their starting position after a working stroke, and means to provide the return of fluid from said hydraulic pressure receiving means to said pressure producing device after the hydraulic pressure in the latter is reduced.

2. The construction as claimed in claim 1, and means to modulate the hydraulic pressure of the fluid transmitted to said receiving means not to exceed a pre-determined multiple of the hydraulic pressure produced by said pressure producing device.

3. In a hydraulic system having a low pressure primary circuit communicating with a pressure producing device and a high pressure secondary circuit connected to hydraulic pressure receiving means, in combination, a hydraulic booster comprising a cylinder and piston of larger displacement actuated by the fluid of said low pressure primary circuit in communication therewith, a cylinder and piston of smaller displacement actuated by said piston in said cylinder of larger displacement to produce an increased pressure transmitted to said high pressure secondary circuit to which said cylinder of smaller displacement is connected, a power operated expansible motor mechanism operatively connected with said pistons to return them to their starting positions after completion of their stroke, and means to direct fluid displaced by said piston in said cylinder of larger displacement during its return stroke to said secondary circuit.

4. The construction as claimed in claim 3, and pressure modulating means to reduce the pressure in said secondary circuit when it exceeds a pre-determined multiple of the pressure in said primary circuit.

5. The construction as claimed in claim 3, means to transmit the hydraulic pressure of said primary circuit to act on said piston in said cylinder of smaller displacement, and pressure modulating means to reduce the pressure in said secondary circuit when it exceeds a pre-determined multiple of the pressure in said primary circuit.

6. In a hydraulic braking system having a master cylinder operated by the operator to produce a primary pressure in a primary circuit, wheel cylinders for applying the brakes responsive to a secondary pressure in a secondary circuit, a booster cylinder having a piston of larger displacement actuated by said primary pressure, a piston of smaller displacement actuated by said piston of larger displacement to produce an increased pressure in said secondary circuit, power operated means to return said pistons to their starting positions after completion of their stroke, means to direct the fluid displaced by said piston of larger displacement into said secondary circuit during the return stroke, means to direct the fluid from said primary circuit to act on said piston of smaller displacement during the return stroke, and pressure modulating means to reduce the pressure in said secondary circuit when it exceeds a pre-determined multiple of said primary pressure.

7. A hydraulic booster having a fluid pressure responsive member of large displacement connected mechanically to a fluid pressure responsive member of small displacement, a primary circuit, a secondary circuit, check valves intermediate said primary circuit and said fluid pressure responsive members so that fluid is enabled to flow from said primary circuit to said fluid pressure responsive members, but not vice versa, check valves intermediate said secondary circuit and said fluid pressure responsive members to enable fluid to pass from said fluid pressure responsive members to said secondary circuit but not vice versa, said fluid pressure responsive members being arranged to reciprocate, power operated means to urge said fluid pressure responsive member of large displacement to discharge the fluid displaced therein into said secondary circuit after said fluid pressure responsive member of large displacement has obtained a full charge of fluid from said primary circuit, and means to provide a passage of fluid from said secondary circuit to said primary circuit when the hydraulic pressure in the latter has fallen below a pre-determined fraction of the pressure in said primary circuit.

8. A hydraulic pressure booster, having a cylinder with a piston of large displacement, a cylinder with a piston of smaller displacement, a primary circuit under a primary fluid pressure, a secondary circuit under a secondary fluid pressure, check valves intermediate said cylinders and said primary circuit and said secondary circuit to enable fluid to pass from said primary circuit to said cylinders, and from said cylinders to said secondary circuit, but not vice versa, said pistons being arranged to reciprocate in unison, a power operated expansible motor mechanism to move said pistons in a direction where the fluid volume in said cylinder with a piston of large displacement is decreased so that the fluid is forced into said secondary circuit, and means to enable fluid in said secondary circuit to return to said primary circuit when the hydraulic pressure in the latter is reduced.

9. A hydraulic pressure booster having a cylinder with a piston of larger displacement and a cylinder with a piston of smaller displacement, a primary hydraulic circuit, a secondary hydraulic circuit, check valves between said primary circuit and said cylinders, and between said secondary circuit arranged to enable fluid to pass from said primary circuit to said cylinders and from the latter to said secondary circuit but not vice versa, said pistons being arranged to reciprocate in unison, a power operated expansible motor mechanism to move said pistons in a direction where the fluid volume in said cylinder with a piston of larger displacement is decreased so that the fluid is forced into said secondary circuit, and valve means to direct power fluid to and from said expansible motor mechanism, where said valve means are urged in a position to direct power fluid to said expansible motor mechanism after the hydraulic fluid in said cylinder with a piston of larger displacement has reached its maximum volume, and where said valve means are urged in a position to direct power fluid from said expansible motor mechanism after the hydraulic fluid in said cylinder with a piston of larger displacement is forced into said secondary circuit.

10. The construction as claimed in claim 9, where said valve means are arranged to remain in a position in which they are placed, until moved into an opposite position at the end of a stroke of said pistons.

11. The construction as claimed in claim 8, and resilient means yieldingly urging said pistons to return to a position where the volume of fluid in said cylinder with a piston of larger displacement is reduced to a minimum.

12. The construction as claimed in claim 6, where said pressure modulating means consist of a valve member on a seat exposed on one side to said primary pressure and on the other side of said seat to said secondary pressure, and pressure sensitive means responsive to said primary pressure urging said valve member in a closed position.

WILLIAM STELZER.